UNITED STATES PATENT OFFICE.

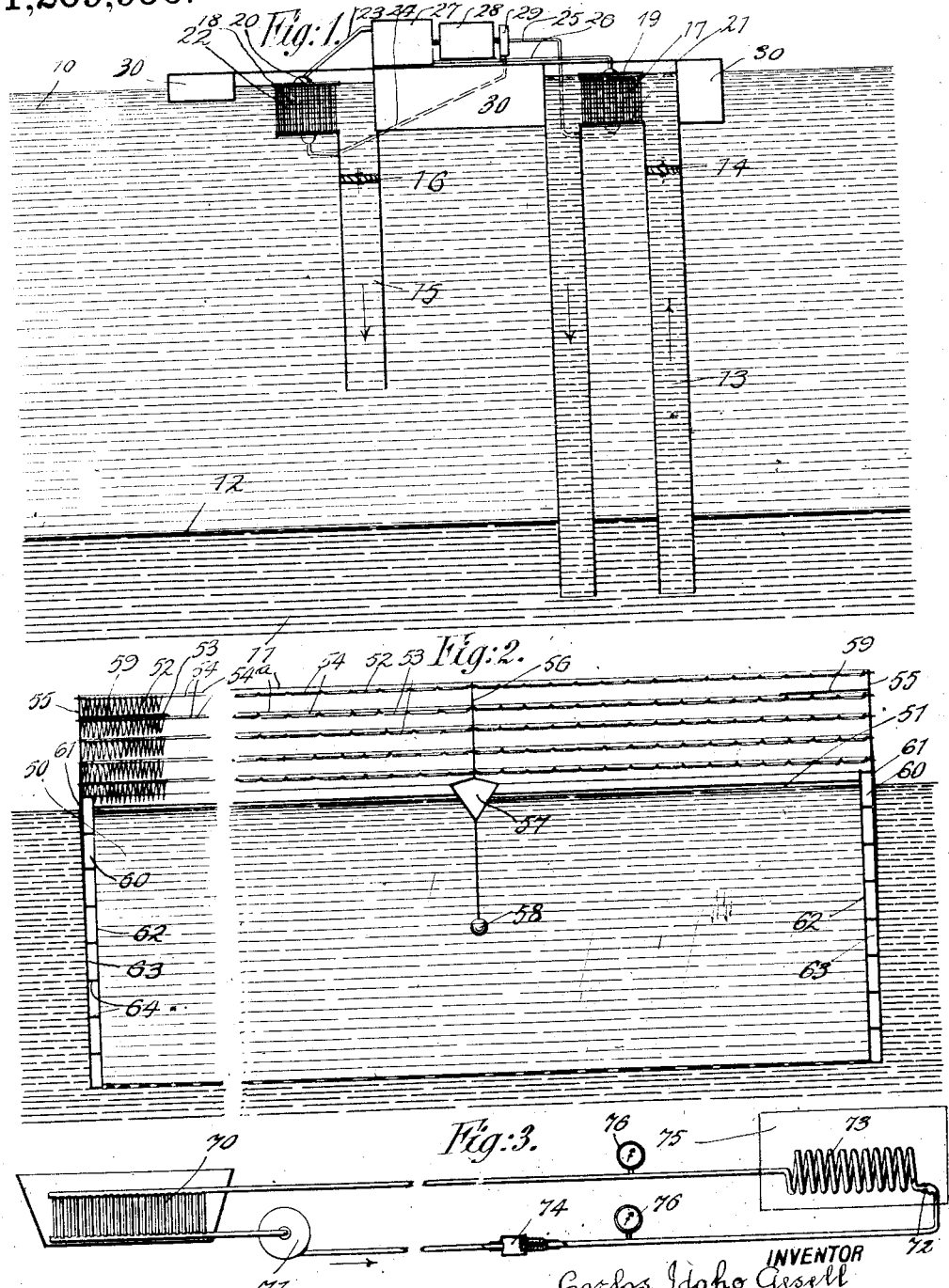

CARLOS IDAHO GESELL, OF BUENOS AIRES, ARGENTINA.

APPARATUS FOR UTILIZING RADIANT HEAT.

1,209,956.  Specification of Letters Patent.  Patented Dec. 26, 1916.

Application filed August 9, 1916. Serial No. 113,855.

*To all whom it may concern:*

Be it known that I, CARLOS IDAHO GESELL, a citizen of the Republic of Argentina, and a resident of Buenos Aires, in Argentina, have invented certain new and useful Improvements in Apparatus for Utilizing Radiant Heat, of which the following is a specification.

The present invention relates to an improved apparatus for utilizing radiant heat, and more especially to a system which facilitates and enables one body of water to attain a relatively high temperature, and another body of water to attain a relatively low temperature, and utilizing these bodies of water to vaporize and condense an easily vaporizable medium for the purpose of producing power, for the production or conduction of cold in or to the places of use or for other purposes.

With these and other objects in view, my invention is shown in the accompanying drawings, and will be hereinafter more fully described with reference thereto, and finally pointed out in the claims.

In the accompanying drawings, Figure 1 is a sectional diagrammatic view showing the method of producing power by the utilization of warm and cold water; Fig. 2 is a similar view, with parts broken away, showing means for containing and segregating the warm or cold water and for retaining the same warm or cold; and Fig. 3 is a diagrammatic view showing the method of conducting the cold from the cold body of water to the place of use.

Similar reference characters indicate corresponding parts throughout the several figures of the drawings.

My invention consists in utilizing the effect of radiation of heat from one body of relatively high temperature to another of relatively low temperature, in such a manner as to heat one body of water to a higher temperature than the surroundings by permitting the sun's rays shining upon the water and by covering said water so as to prevent the radiation of heat when the sun is not able to impart heat to the water, and combining such warm waters and cold bodies produced in a similar way by preventing the absorption of heat, or natural cold bodies of water with vaporizers and condensers to utilize their respective high and low temperatures to vaporize or condense an easily vaporizable medium. In the case of oceans, deep seas, or lakes, nature provides the means for providing one cool body of water. The water of the surface of seas or lakes is subjected in the wintertime to an intense cooling. The water, once cooled, having a greater density than the warmer surface water, descends to the depths, where it is protected from the sun's rays by the upper layers of water and remains there until cooler water displaces it again. In oceans, the water in the regions of the poles is subjected to the radiation of heat, which lost heat cannot be replaced by the action of the sun, so that consequently the waters are cooled at these areas, and when so cooled descend to the depths, from where they flow throughout the lower parts of the ocean. Thus, in the neighborhood of San Francisco and Los Angeles, the water of the uppermost layers of the ocean has an average temperature of 15° to 20° C., while in 400 m. depth the temperature is 6° to 7° C., and in 1,000 meters depth it is as low as 3° C. On the eastern coast of the American continent, between 30° and 40° N., the upper layers of water have an average temperature of 25° to 12° C., while at 400 m. depth they have a temperature of only 4° to 2° C. In the Gulf of Mexico, the average temperature of the upper layers is 27° C., and in 1,000 depth it is 5° to 6° C. It is clear that where such water is available, my invention will find convenient application and use.

In Fig. 1, I have shown a power system utilizing the warm water of the upper layers of water and the cold of the lower layers, the warm water 10 being preferably separated from the cold 11 by a sheet of tarred cloth 12. The temperature of the warm water may be intensified and the heat stored by the means shown in Fig. 2, and hereinafter more fully described. An inverted U-shaped channel 13 is provided which extends from the surface of the water to the cold water of the depths, an impelling pump 14 being provided therein which carries a flow of the cold water therethrough. Another channel 15 is provided in the warm water, also having a pump 16 therein which carries a flow of the warm water therethrough. Within these channels are respectively provided condensers 17 and vaporizers 18, which are washed respectively by the cold and warm water. These vaporizers and condensers comprise each heads 19 and 20 connected by a large number of thin pipes 21 and 22 of approximately 1 cm. in diameter, having a large surface and thin walls, made preferably of a non-rusting alloy of steel or brass, and for the condenser having preferably an inclination of 45° to the horizontal. A ventilator is preferably provided, which forces the vapors contained in the condensers to flow with a great velocity through said thin pipes. The vaporizer is preferably provided with means which cause the liquid fluid to flow down on the walls of the thin pipe, in a thin layer, which is vaporized upon reaching the lower end of the pipe. Within these vaporizers and condensers is placed an easily vaporizable medium, such as ammonia, sulfur dioxid, carbon dioxid, ether, or the like. The condensers and vaporizers are in communication with each other by pipes 23 and 26, which are for the vapors, and 25 and 24, which are for the liquid flow. In the vapor circuit is provided a turbine or engine 27, which is connected to a dynamo 28 and a pump 29, the latter being in the circuit of the pipes 25 and 24 through which the liquid flows. The apparatus is mounted upon a series of floats 30. The electric power thus produced may be conducted by means of cables in the usual manner. It will be understood that if desired the condenser may be arranged at a considerable depth in the cold water, or at the bottom of the sea, water circulating means being provided.

The operation is as follows:—The liquid contained in the vaporizer, which for example is ammonia, is vaporized by the effect of the warm water. If the warm water has a temperature of 45° C., a temperature of 40° C. will easily be reached within the vaporizer, and this temperature corresponds to a pressure of about 16 atm. The ammonia vapors contained within the condenser are influenced by the cold water, which may have a temperature of 0° C. The ammonia within the condenser would have a temperature of about 5° C., which corresponds to a pressure of 5¼ atm. This difference in pressure is utilized by the vapor turbine, which drives the dynamo and pump, the pump forcing the condensed medium from the condenser to the vaporizer against the difference in pressure at the same rate as it condenses, which is easily brought about as the liquid has a much smaller volume than the vapor. With this system, power is obtained at a very reduced cost, and the commercial exploitation of a plant using the same is permitted in many countries of the tropical and temperate zones. As the basin hereinafter described permits a deep body of water to be provided, large quantities of energy can be stored in it, which permits the production of power during the night and cloudy periods. If the water is deep enough, it should be possible to store the heat from the summer to last all winter, and the cold of the winter to last all summer, thus permitting great differences in temperature to be attained, together with reliability and uniformity in power production.

In Fig. 2, I have shown a means of retaining the water warm, and of isolating the warm from the cold water. A large basin, made preferably of tarred cloth 50, and adapted to contain the warm water, is provided with a layer of oil 51 over said water. An upper cover 52 and a plurality of lower covers 53 are provided, adapted to be folded or rolled up and extended on wires 54 over the water, the wires being supported by posts at the sides of the basin and upwardly extending portions 56 of buoys 57, each of which is held in vertical position by means of a weight 58 fixed on a prolongation thereof, or other suitable means, as wires, may be employed. The uppermost cover 52 is preferably formed of a strong permeable, preferably white cloth, while the lower covers, which may be of any desired number, are preferably made of coarse large mesh cloth or net, having paper glued thereon. The purpose of the upper cover is to hinder as much as possible the radiation of heat, and to protect the lower ones from the wind. This cover must be permeable in order to prevent an accumulation of rain water on it. The lower covers are extended only when the upper covers are extended, special wires 54ª being provided, which upon being pulled extend or retract all of the covers simultaneously, and their purpose is to prevent a circulation of air and to hinder the conduction of heat by convection between the water and the atmosphere. As these lower covers may be easily affected by humidity, they are rolled up or folded below the extended upper covers when raining, and they may be protected by a shelter 59, as shown at the left of the figure.

It is of course understood that the covers may be made of any desired material which fulfils their purpose of hindering the radiation of heat and air circulation, when extended over the water, and that preference can be given to such material which has a small coefficient of radiation of heat as are silver, copper, tin or zinc, or steel coated with these metals, and which is at the same time durable and not too expensive.

The sections of covers may be of any desired number to cover the required area, and the extent of the basin may be of any practical size.

The layer of oil permits heating of the water while preventing vaporization thereof, and the consequent cooling and it may be substituted by another material having a like effect.

In order to prevent a fall of snow into the warm water, the uppermost cloth may be arranged to be revolved on special rollers provided for this purpose, so that the snow is guided or deflected away.

If desired, several means for causing artificial convection may be provided, distributed in different parts of the warm body of water for causing uniform temperature of water throughout the basin. These means preferably draw the water from the upper layer and cause it to descend to the lower parts of the basin, and they may be similar to the conduit for the warm water, shown and described in the power plant. As this body of water is exposed to the sun's rays while the radiation of heat during the night is prevented, as well as the evaporation, the water acquires a relatively high temperature.

The basin, as above stated, floats within the ocean, sea or lake, and is kept in position by means of anchors, and is provided with an iron frame to break the waves. This iron frame is kept floating by means of air chambers 60, and is preferably constructed slightly elastic for avoiding the necessity of making it too strong. It is made of thicker material, as at 61, at the surface of the water than at the upper and lower ends, and it may be reinforced by means of wires, T-irons or the like.

It is not necessary that the iron frame be as deep as the basin, as the lower part of the basin can be made entirely of tarred cloth.

The sides of the basin have preferably a second layer of tarred cloth 62 which forms a dead water space 63 between the warm water within the basin and the cooler water surrounding the same, or if desired, several of these layers may be provided. A circulation of water between both layers is prevented by intersection of other layers 64 which unite the outer layer with the inner one. The water being a poor heat conductor, good protection is provided for the warm water. The basin will be preferably constructed in round shape in order to better resist the slight pressure at the surface caused by the difference in level of the inner and outer waters, this difference in level being occasioned by the difference in specific gravity of both waters. If desired, the bottom of the basin may be dispensed with, as the warm water will remain at the top. For producing cold, a similar basin and cover are employed, with the exception that the layer of oil is dispensed with, the cover being extended when the sun is shining to prevent the radiation of heat to the water. The water may contain salts to reduce the freezing point and may be colored dark if desired, to facilitate the freezing. The ice may be gradually covered with water as it freezes. As this body of water is exposed to the radiation of heat during the night, and protected from the sun's rays during the day, it will reduce its temperature below the temperature of the surroundings. In both bodies the water will be different in temperature from the surroundings, and the difference will be greater according to the clearness of the sky.

In Fig. 3, I have shown a method for the production or conduction of the cold from the cold body of water to the place of use. For this purpose, a condenser 70, identical to that used for the power plant, is provided influenced by the cold water, a pump 71 being intersected within the circuit of the condensed medium, to elevate the liquid pressure enough to occasion a circulation of the fluid within the pipe circuit, and to avoid a vaporizing of the fluid when being conducted through hot places, such for instance, as the hot streets. At the place of use of the cold, which may be a house in a city, the liquid flows through a small orifice 72 from the circuit of high pressure to the circuit of low pressure, having the vapor circuit. In this circuit, the liquid vaporizes, absorbing the necessary heat from the surroundings, thereby cooling the surroundings. To this purpose the pipes 73 contained in the room 75, in which the fluid vaporizes, are provided with radiating surfaces, or the surfaces are otherwise enlarged in some suitable manner. The vaporizing room may be considered as equivalent to the warm water in its effect upon the vaporizing pipes 73. After being thus converted into vapor, the fluid is conducted within the vapor circuit to the condenser, where through condensing, it gives up heat which it absorbed while vaporizing and heats the cold body of water or melts the ice stored in it. If desired to produce a lower temperature in the vaporizer than that of the condenser, a combined suction and compression pump may be provided, which reduces the pressure in the vaporizing circuit. If the temperature is not required to be as low as that of the condenser, a power producing engine may be intersected within the circuit of vapor. In this case, the system would be similar to the power producing system above described. The pipe circuit is preferably provided with a speed limit valve 74, which closes if the normal speed is exceeded, preventing a loss of the entire fluid contained in the pipe if a pipe of the system bursts. Fluidometers 76 are inserted in both the liquid and vapor pipe systems, so as to control the flow of fluid therethrough, and these fluidometers may be provided with means for stopping the flow of the fluid if both do not advance synchronously. With this system, cold can be obtained at a very reduced cost within the places of use at a considerable distance from the cold body of water, and it may be utilized for all the purposes for which ice is used today, and for cooling and removing the humidity from the air in habitations. The radiators which in the wintertime are used to heat the rooms, may be so arranged that in summertime they are used as coolers, and air driers, condensing the humidity on their surfaces.

I have illustrated and described preferred and satisfactory forms of my invention, but it is obvious that changes may be made therein, within the spirit and scope thereof as defined in the appended claims.

I claim:

1. An improved system for vaporizing a vaporizable medium, comprising a large expanse of water exposed to the effect of the sun's rays, means for hindering the loss of heat over a portion of said expanse of water, means for segregating said portion of warm water from the surrounding cooler water, comprising a confining wall floating within said expanse of water, and a vaporizer affected by said warm water.

2. An improved system for vaporizing a vaporizable medium, comprising a large expanse of water, exposed to the effect of the sun's rays, means for hindering the loss of heat over a portion of said expanse of water, means for segregating said portion of warm water from the surrounding cooler water, comprising a confining wall floating within said expanse of water, provided with a dead water space for isolating against heat conduction, and a vaporizer affected by said warm water.

3. An improved system for condensing vapors, comprising a large expanse of water having the lower layers protected from the sun's rays by the upper layers, said lower layers remaining cool, means for bringing the water from the lower layers toward the surface comprising a conduit, means for generating a water circulation through said conduit, and condensing means within said cool water containing a condensible medium which condenses as it gives up heat to the cool water.

4. An improved system for vaporizing a vaporizable medium, which comprises an expanse of warm water exposed to the effect of the sun's rays, movable means over the said expanse for hindering the loss of heat and adapted to be extended over said water, and a vaporizer affected by said warm water, said vaporizer containing a vaporizable medium which vaporizes as it absorbs heat from said water.

5. An improved system for vaporizing a vaporizable medium which comprises a body of water exposed to the effect of the sun's rays and provided with means for keeping it warm, said means being supported by means supported by said warm water and a vaporizer affected by said warm water, said vaporizer containing a vaporizable medium which vaporizes as it absorbs heat from said warm water.

6. An improved system for acting upon an easily convertible medium utilizing a given temperature of water, comprising an expanse of water exposed to the effect of radiation and provided with movable means adapted to hinder a temperature exchange between the water and the atmosphere when extended over said water and heat exchange means containing an easily convertible medium, said medium adapted to have its volume changed as its physical state of being is converted when acted upon by said water.

7. An improved system for acting upon an easily convertible medium utilizing a given temperature of water, comprising an expanse of water exposed to the effect of radiation and provided with movable means adapted to hinder a temperature exchange between the water and the atmosphere when extended over said water, said means being supported by means supported by said water and heat exchange means containing an easily convertible medium, said medium adapted to have its volume changed as its physical state of being is converted when acted upon by said water.

8. An improved system for acting upon an easily convertible medium utilizing a given temperature of water, comprising an expanse of water exposed to the effect of radiation, movable means adapted to hinder a temperature exchange between the water and the atmosphere when extended over a portion of said expanse of water, means for segregating said portion of water from the surrounding water comprising a confining wall floating within said expanse of water and heat exchange means containing an easily convertible medium, said medium adapted to have its volume changed as its physical state of being is converted when acted upon by said water.

In testimony, that I claim the foregoing as my invention, I have signed my name in presence of two subscribing witnesses.

CARLOS IDAHO GESELL.

Witnesses:
 M. MacWeinberg,
 D. Lewis Mattern.